US012781495B2

(12) United States Patent
Dalle Nogare

(10) Patent No.: US 12,781,495 B2
(45) Date of Patent: Nov. 3, 2026

(54) APPARATUS FOR ON-SITE PRODUCTION OF COMPONENTS FOR CONCRETE BUILDING

(71) Applicant: ATMOSPHERE TECHNOLOGIES S.R.L., Milan (IT)

(72) Inventor: Federico Dalle Nogare, Milan (IT)

(73) Assignee: ATMOSPHERE TECHNOLOGIES S.R.L., Milan (IT)

( * ) Notice: Subject to any disclaimer, the term of this patent is extended or adjusted under 35 U.S.C. 154(b) by 135 days.

(21) Appl. No.: 18/848,238

(22) PCT Filed: Mar. 17, 2023

(86) PCT No.: PCT/IB2023/052644
§ 371 (c)(1),
(2) Date: Sep. 18, 2024

(87) PCT Pub. No.: WO2023/175582
PCT Pub. Date: Sep. 21, 2023

(65) Prior Publication Data

US 2025/0207382 A1 Jun. 26, 2025

(30) Foreign Application Priority Data

Mar. 18, 2022 (IT) ........................ 102022000005342

(51) Int. Cl.
*E04B 1/16* (2006.01)
*B28B 5/04* (2006.01)
*B28B 15/00* (2006.01)

(52) U.S. Cl.
CPC .................. *E04B 1/16* (2013.01); *B28B 5/04* (2013.01); *B28B 15/002* (2013.01); *B28B 2005/042* (2013.01)

(58) Field of Classification Search
CPC .. E04B 1/16; B28C 9/04; B28C 7/163; B28B 5/04; B28B 15/002; B28B 1/087;
(Continued)

(56) References Cited

U.S. PATENT DOCUMENTS 3,807,706 A * 4/1974 Kugle .................. F04B 7/0225 366/27
3,920,357 A * 11/1975 Taylor ..................... B28C 7/163 417/900
(Continued)

FOREIGN PATENT DOCUMENTS

CN 110421690 A 11/2019
CN 113021609 A * 6/2021 ........... B28B 15/007
(Continued)

OTHER PUBLICATIONS

International Search Report and Written Opinion for corresponding PCT Application No. PCT/IB2023/052644, mailed Jul. 21, 2023.

*Primary Examiner* — Brian E Glessner
*Assistant Examiner* — Adam G Barlow
(74) *Attorney, Agent, or Firm* — K&L Gates LLP

(57) ABSTRACT

Apparatus (100) for on-site production of components for concrete building, comprising a box-like containing structure (10) suitable for conveying and defining a containing volume (V) comprising a first subvolume (V1) and a second subvolume (V2). The apparatus (100) further comprises a support frame (20) housed in the first subvolume (V1), at least two formworks (30*a*, 30*b*) for containing a preset quantity of concrete. Each formwork (30*a*, 30*b*) is slidably housable in the support frame (20) to assume a storage configuration and an extraction configuration in which the formwork (30*a*, 30*b*) is at least partially extracted from the support frame (20)). The apparatus (100) further comprises an extractor device (40) configured to withdraw at least one formwork (30*a*, 30*b*) by moving the formwork (30*a*, 30*b*)
(Continued)

between the storage and extraction configurations. The apparatus further comprises liquid concrete feeding means (50) configured to dispense concrete to each formwork (30*a*, 30*b*).

11 Claims, 7 Drawing Sheets

(58) Field of Classification Search
CPC ..... B28B 13/021; E04G 19/003; E04G 21/04; B65D 88/129; B65D 88/121; B65D 88/128
See application file for complete search history.

(56) References Cited

U.S. PATENT DOCUMENTS 4,708,611 A * 11/1987 Bouteiller ................ B28B 7/02 249/129
11,999,089 B2 * 6/2024 Perkins ............ B29C 45/14598
2013/0330434 A1 * 12/2013 Wilkie ................. B29C 48/919 425/62
2015/0267422 A1 * 9/2015 Tan ....................... E04G 19/003 249/188
2017/0101792 A1 * 4/2017 Campbell .......... E04G 21/0418
2018/0179769 A1 * 6/2018 Schreyer ................... B28B 7/08
2021/0146573 A1 * 5/2021 Roux ..................... B01F 27/50
2022/0055247 A1 * 2/2022 Petit ....................... B33Y 30/00
2022/0088822 A1 * 3/2022 Butler ..................... E04G 21/04
2022/0213888 A1 * 7/2022 Baechle .................. F04B 15/02
2022/0410257 A1 * 12/2022 Mohanty ................ B22D 41/02
2023/0205186 A1 * 6/2023 Zhou ...................... B25J 9/1682 700/197

FOREIGN PATENT DOCUMENTS

DE 202006016561 U1 * 3/2007 ............. B28B 11/24
EP 2629948 B1 * 1/2016 ......... B28B 17/0081
WO 2023175582 A1 9/2023

* cited by examiner

APPARATUS FOR ON-SITE PRODUCTION OF COMPONENTS FOR CONCRETE BUILDING

CROSS-REFERENCE TO RELATED APPLICATIONS

This application is a U.S. National Stage Entry under 35 U.S.C. § 371 of International Patent Application No. PCT/IT2023/052644, entitled APPARATUS FOR ON-SITE PRODUCTION OF COMPONENTS FOR CONCRETE BUILDING, filed Mar. 17, 2023, which claims benefit of Italian Patent Application No. 102022000005342, filed Mar. 18, 2022, the entire disclosures of which are hereby incorporated by reference herein.

The present invention relates to an apparatus for on-site production of components for concrete building.

Examples of such cementitious components or artefacts can be slabs, panels, curbs, urban building components of different shape and size, and the like.

The present invention is used in the construction field, for example in the field of prefabricated buildings, where various concrete components, in particular panels, are assembled together to form living spaces, storage spaces and the like.

As is known, the production process of components for concrete building is characterised by the use of large quantities of materials and the use of particularly bulky and expensive machinery which are difficult to transport comfortably from one production site to another. For these reasons, the building components are usually manufactured in a single production site and only subsequently transported to the place where they are assembled together, for example to form pre-fabricated buildings.

Such a production and transport method is particularly inconvenient and impracticable in low-industrialised countries such as the countries of Africa.

A first difficulty encountered in such countries is usually that of geographic conformation. In fact, in such countries, the connections between different places are particularly difficult due to the scarce infrastructure and the roughness of the territory. The transport of materials and machinery suitable for the creation of components is in fact difficult and expensive.

This implies an increase in construction times and the necessary resources.

A second difficulty is also linked to the preparation of a suitable and practical site for carrying out the concrete pouring.

Very often, in fact, in less industrialised countries there is difficulty installing a suitable structure for carrying out the pouring to create the components in a reliable and fast manner.

A further difficulty is given by the storage of the components made and waiting for use.

As is known, in order to be able to use a concrete component, after pouring it is necessary to wait for a period of at least partial drying of the latter. More in detail, it is best for the concrete to undergo a first drying within the moulds in which it has been poured to form a component. Subsequently, the concrete component is extracted so as to undergo a second drying so that the component has the correct mechanical properties.

This implies the need to have adequate spaces (in terms of size but also in terms of environmental conditions) in which to carry out at least the first drying.

A further difficulty arises from the fact that in less industrialised countries, it is difficult to find a highly specialised workforce capable of best exploiting specific innovative technologies.

The object of the present invention is thus to provide an apparatus for on-site production of components for concrete building capable of overcoming the prior-art drawbacks which have emerged.

A further object of the present invention is therefore to provide an apparatus for on-site production of components for concrete building which allows to produce the components in the same place where they must be assembled, i.e., which allows a decentralisation of the production of such products.

A further object of the present invention is therefore to provide an apparatus for on-site production of components for concrete building which allows to reduce the time and the costs related to the transport of the concrete products and components.

A further object of the present invention is therefore to provide an apparatus for on-site production of components for concrete building which are easy to use even by low-skilled workers.

A further object of the present invention is to provide an apparatus for on-site production of components for concrete building which allows to avoid having to build on-site ad hoc structures to perform the pouring of concrete and/or to allow the latter to dry once poured.

A further object of the present invention is to provide an apparatus for on-site production of components for concrete construction which allows to reduce the costs and production times of the components themselves.

The specified technical task and the specified aims are substantially achieved by an apparatus for on-site production of components for concrete building comprising the technical features set forth in one or more of the appended claims. The dependent claims correspond to possible embodiments of the invention.

Further features and advantages of the present invention will become more apparent from the following indicative, and hence non-limiting, description of an apparatus for on-site production of components for concrete building.

Such a description will be set out below with reference to the accompanying drawings, which are provided solely for illustrative and therefore non-limiting purposes, in which.

Figure 1A:
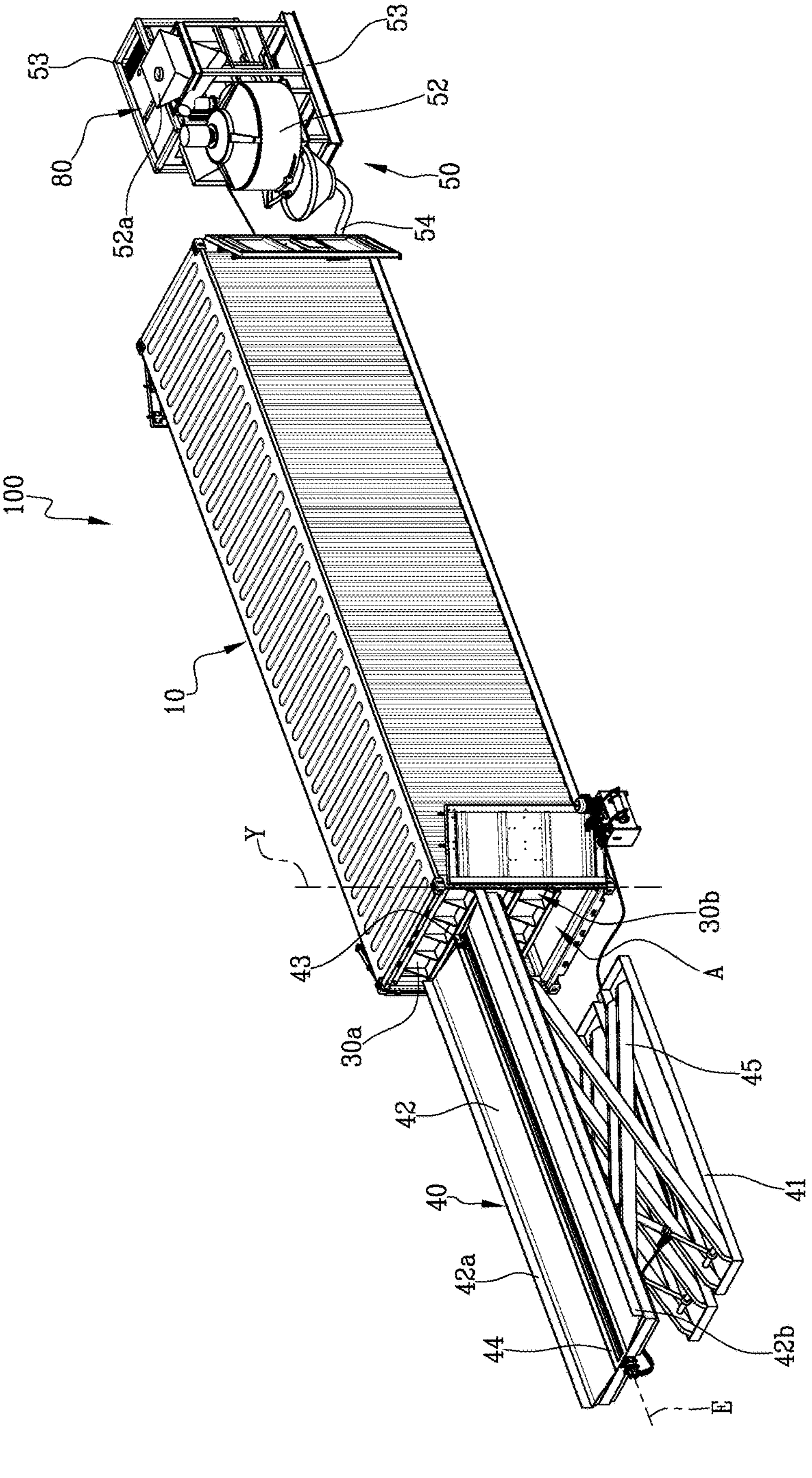
FIG. 1A shows an apparatus for on-site production of components for concrete building object of the present invention in an operating configuration.

With reference to the appended drawings, 100 denotes an apparatus for the on-site production of components for concrete building, such as slabs, curbs and the like, according to the present invention.

In accordance with an aspect of the present invention, the apparatus 100 can further allow the production of components for construction in pre-compressed concrete.

The apparatus 100 comprises a box-like containing structure 10 suitable for conveying.

The term "suitable for conveying" means that the containing structure 10 is suitable for being loaded onto a ship, a train, a truck, a helicopter and the like so that the entire apparatus 100 is transportable to the place where it is intended to start a production of the concrete components and, subsequently, a construction by means of such components.

Preferably, the apparatus 100 has an overall weight comprised between 15 tonnes and 30 tonnes.

Even more preferably, the apparatus 100 has an overall weight comprised between 20 tonnes and 25 tonnes.

In the case of transport by helicopter, the apparatus 100 has a weight of about 21 tonnes.

In accordance with a possible embodiment, the containing structure 10 comprises a container of standard dimensions, preferably of the 20', 40' or 45' type (the symbol ' indicates the unit of measurement feet).

Preferably, the container can be of the HCC High Cube Container type.

Advantageously, the use of the container contributes to making the entire apparatus 100 easily movable and handleable so as to be transported where necessary.

As shown in the accompanying drawings, the containing structure 10 defines a containing volume "V" with preferably horizontal extension.

The containing volume "V" comprises a first subvolume "V1" and a second subvolume "V2" placed alongside one another.

The apparatus 100 further comprises a support frame 20 housed in the first subvolume "V1" and defining a plurality of support areas juxtaposed on one another along a vertical stacking direction "Y".

That is, the support frame 20 defines a sort of shelving or vertical warehouse provided with shelves one juxtaposed to the other vertically along the stacking direction "Y".

In accordance with an embodiment, the support frame 20 is a frame of lattice type.

Advantageously, the use of the lattice frame makes the entire apparatus 100 lighter and more easily transportable to the place where it is intended to start the production of the components for building.

Preferably, the support frame 20 is formed by a plurality of rectangular-section pipes made of metal material, preferably iron or 20 stainless steel, and welded together by means of MIG (Metal-arc Inert Gas) welds.

Even more preferably, such pipes are surface treated to preserve the mechanical properties thereof.

In a preferred embodiment, the support frame 20 is sized to be inserted to measure in the containing structure 10.

As shown in the accompanying drawings, in fact, the support frame 20 is adherent to the walls of the containing structure 10 so that it is possible to best exploit the containing volume "V".

As shown in the accompanying drawings, the apparatus 100 comprises at least two formworks 30*a*, 30*b*, 30*c* each configured to contain a preset quantity of concrete for forming at least one respective component.

In the embodiment shown in the accompanying drawings by way of non-limiting example, the apparatus 100 comprises three formworks 30*a*, 30*b*, 30*c*.

Each formwork 30*a*, 30*b*, 30*c* is slidably housable in a respective support area of the support frame 20.

Preferably, each formwork 30*a*, 30*b*, 30*c* is slidably movable at least along an extraction direction "E", preferably horizontal.

As shown in the accompanying drawings, each formwork 30*a*, 30*b*, 30*c* is slidably movable to assume a storage configuration (FIG. 1A, 1B), in which the formwork 30*a*, 30*b*, 30*c* is inserted into the support frame 20, and an extraction configuration (FIG. 2), in which the formwork 30*a*, 30*b*, 30*c* is at least partially extracted from the support frame 20.

In particular, as will be described in detail below, each formwork 30*a*, 30*b*, 30*c* assumes the storage configuration when it is filled with liquid concrete so that the latter can at least partially dry while the formwork 30*a*, 30*b*, 30*c* is placed inside the containing structure 10. Each formwork 30*a*, 30*b*, 30*c* assumes the storage configuration even when it is empty and must be filled with liquid concrete.

Advantageously, the presence of the support frame 20 allows a filling of the formworks 30*a*, 30*b*, 30*c* directly inside the apparatus 100 without the need to build ad hoc structures or supports for filling the formworks 30*a*, 30*b*, 30*c*.

Advantageously, the presence of the support frame 20 allows a storage (at least during a partial drying period) of the forming components within the formworks 30*a*, 30*b*, 30*c* without there being a need to create an ad hoc structure outside the apparatus 100.

According to an aspect of the present description, as shown in the accompanying drawings, each formwork 30*a*, 30*b*, 30*c* is housed within a respective support area so as to have a main dimension arranged along the extraction direction "E" and parallel to the main dimension of the containing structure 10.

That is, each formwork 30*a*, 30*b*, 30*c* is housed within a respective support area so as to act as a drawer or a removable shelf, along the extraction direction "E", for the support frame 20.

Figure 3:
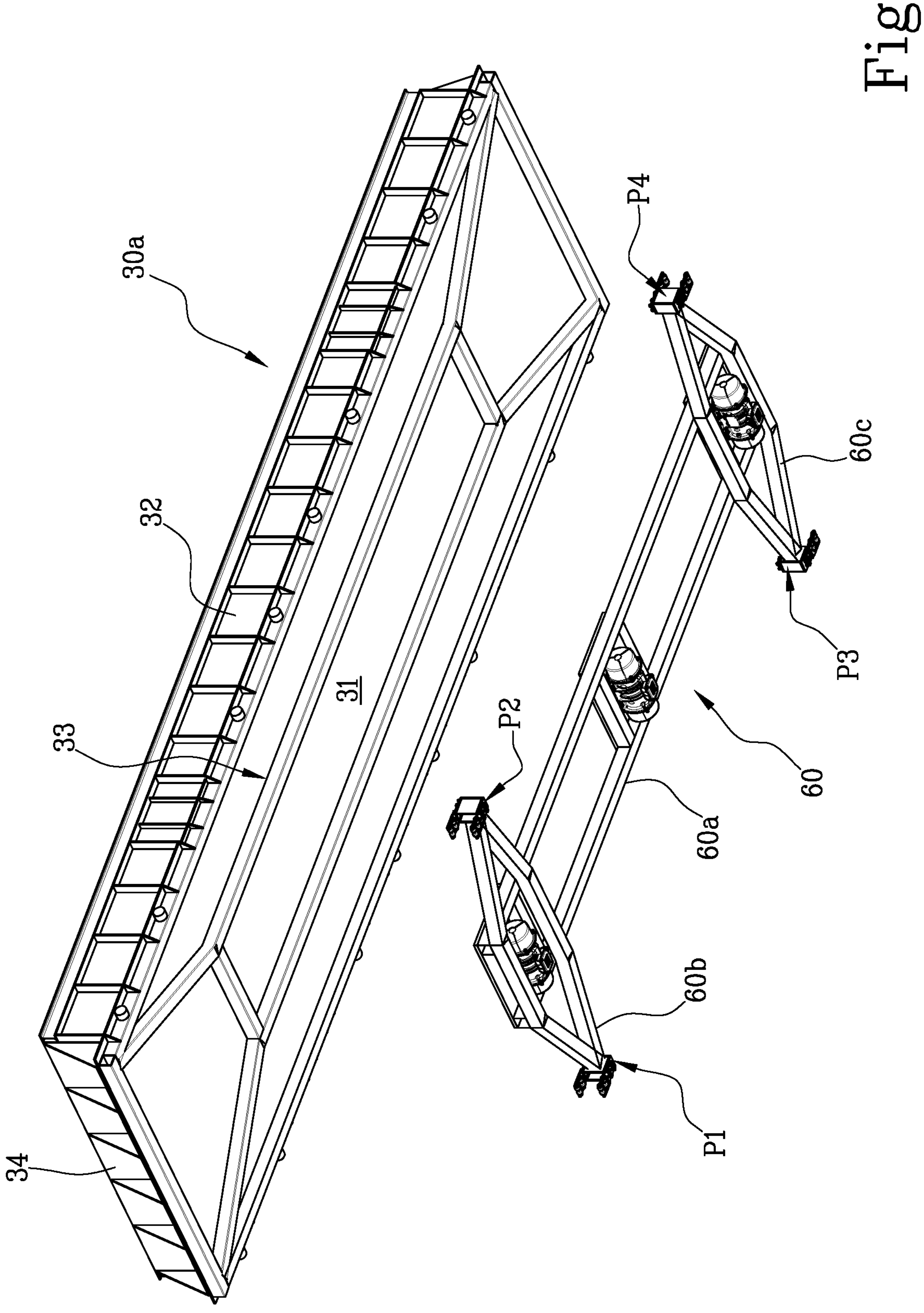
FIG. 3 shows a perspective view of two components of the apparatus of FIG. 1A.

As shown in FIG. 3, each formwork 30*a*, 30*b*, 30*c* has the shape of a tank, for example a rectangular-section tank, with a bottom wall 31, a pair of side walls 32 opposite each other and a pair of partitions 34 opposite each other.

As shown in the accompanying drawings, each formwork 30*a*, 30*b*, 30*c* is housed within a respective support area so as to have the side walls 32 arranged along the extraction direction "E".

In accordance with an aspect of the present invention, the pair of side walls 32 is fixed, preferably welded, to the bottom wall 31.

In accordance with a further aspect of the present invention, the partitions 34 of the pair of partitions are movable towards and away from each other along the extraction direction "E" so as to vary a containing volume of the formwork 30*a*, 30*b*, 30*c*.

Advantageously, the possibility of adjusting the mutual position of the partitions 34, and therefore the dimensions and volume of the formwork 30*a*, 30*b*, 30*c*, allows the apparatus 100 to be flexible and to produce different types of components.

Preferably, each formwork 30*a*, 30*b*, 30*c* is made of metal material and, even more preferably, sheet metal.

In accordance with an aspect of the invention, each formwork 30*a*, 30*b*, 30*c* comprises at least one indicator device (not depicted), for example a laser, configured to project a filling diagram for the formwork 30*a*, 30*b*, 30*c*.

In detail, the indicator device is configured to identify the positioning regions within the formwork 30*a*, 30*b*, 30*c* indicating the points where an operator, before the concrete pouring, must position outlines (for example of box-like elements, wedges or the like) so as to obtain a shaped component. If, for example, it is necessary to make a component bearing, in a preset position (i.e., at a preset distance from the external edges), a hole, the indicator device will project a diagram on the formwork 30*a*, 30*b*, 30*c* indicating the point where it is necessary to position an outline having the form and size of the hole to be obtained. In such a situation, following the positioning of the outline, the concrete can be poured in the formwork 30*a*, 30*b*, 30*c* obtaining the desired perforated component.

Preferably, the outlines are magnetic so as to be able to reversibly but stably adhere to the side walls 32*a* and/or the partitions 34 and/or the bottom wall 31 of the formwork 30*a*, 30*b*, 30*c*.

In accordance with a possible embodiment, on a partition 34, each formwork 30*a*, 30*b*, 30*c* comprises a feeding opening 32*a* and a cap 32*b* movable between a closing position, in which it occludes the feeding opening 32*a* so as to prevent a leakage of the liquid concrete contained in the formwork 30*a*, 30*b*, 30*c*, and an opening position, in which it is distal from the feeding opening 32*a* to allow a filling of the formwork 30*a*, 30*b*, 30*c* with the concrete, as will be described in detail below.

Preferably, the feeding opening 32*a* is made on the partition 34 near the bottom wall 31 so as to fill the formwork 30*a*, 30*b*, 30*c* from below.

Advantageously, the fact of filling each formwork 30*a*, 30*b*, 30*c* from below prevents a massive formation of air bubbles during pouring.

In accordance with an aspect of the present description, the apparatus 100 further comprises liquid concrete feeding means 50 arranged at least in part in the second subvolume "V2" and configured to dispense the preset quantity of concrete to each formwork 30*a*, 30*b*, 30*c* while the latter is housed in the respective support area.

According to a further aspect of the present description, the feeding means 50 comprises at least one pump 51.

The pump 51 is selectively connectable, by means of a feeding pipe 51*a*, preferably flexible, to each formwork 30*a*, 30*b*, 30*c* housed in the first subvolume "V1", i.e., in the support frame 20, so as to dispense the preset quantity of concrete in the formwork 30*a*, 30*b*, 30*c*.

Figure 5:
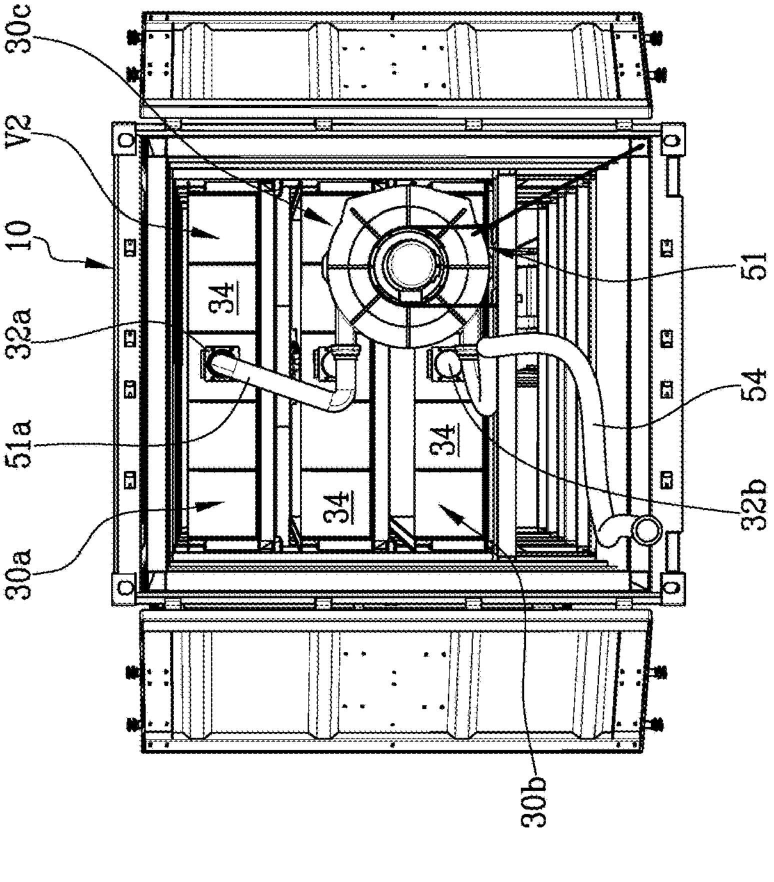
FIG. 5 shows a front view of a portion of the apparatus of FIG. 1A.

More in detail, as shown in FIG. 5, to perform the filling of each formwork 30*a*, 30*b*, 30*c* housed in the support frame 20, the feeding pipe 51*a* is reversibly connected to the feeding opening 32*a* of a first formwork 30*a*, 30*b*, 30*c* to dispense the preset quantity of concrete therein. At the end of such dispensing, the feeding pipe 51*a* is removed from the feeding opening 32*a* and the cap 32*b* is brought into the closing position. Subsequently, the feeding pipe 51*a* is connected to the feeding opening 32*a* of a second formwork 30*a*, 30*b*, 30*c* to perform the filling thereof by means of the concrete.

The operations of removing and connecting the feeding pipe 51*a* to the feeding opening 32*a* of the formworks 30*a*, 30*b*, 30*c* are repeated for each formwork 30*a*, 30*b*, 30*c* housed within the support frame 20 so that each formwork 30*a*, 30*b*, 30*c* is filled with the liquid concrete. In the preferred embodiment, the pump 51 is arranged in a fixed position.

In particular, as shown in the accompanying drawings, the pump 51 is housed within the second subvolume "V2".

Preferably, the pump 51 is positioned so as to face the formworks 30*a*, 30*b*, 30*c* housed within the respective support areas of the support frame 20, and in particular, facing their feeding openings 32*a*.

Even more preferably, the pump 51 is supported on a protrusion obtained in the support frame 20 so as to be positioned at a level from the ground equal to about half the height of the support frame 20 itself (FIG. 5).

Such positioning is advantageous in that it allows the feeding pipe 51*a* to comfortably reach all the feeding openings 32*a* of the formwork 30*a*, 30*b*, 30*c* placed in the support frame 20 without there being the need to lift or lower the pump 51 within the second subvolume "V2".

Figure 1B:
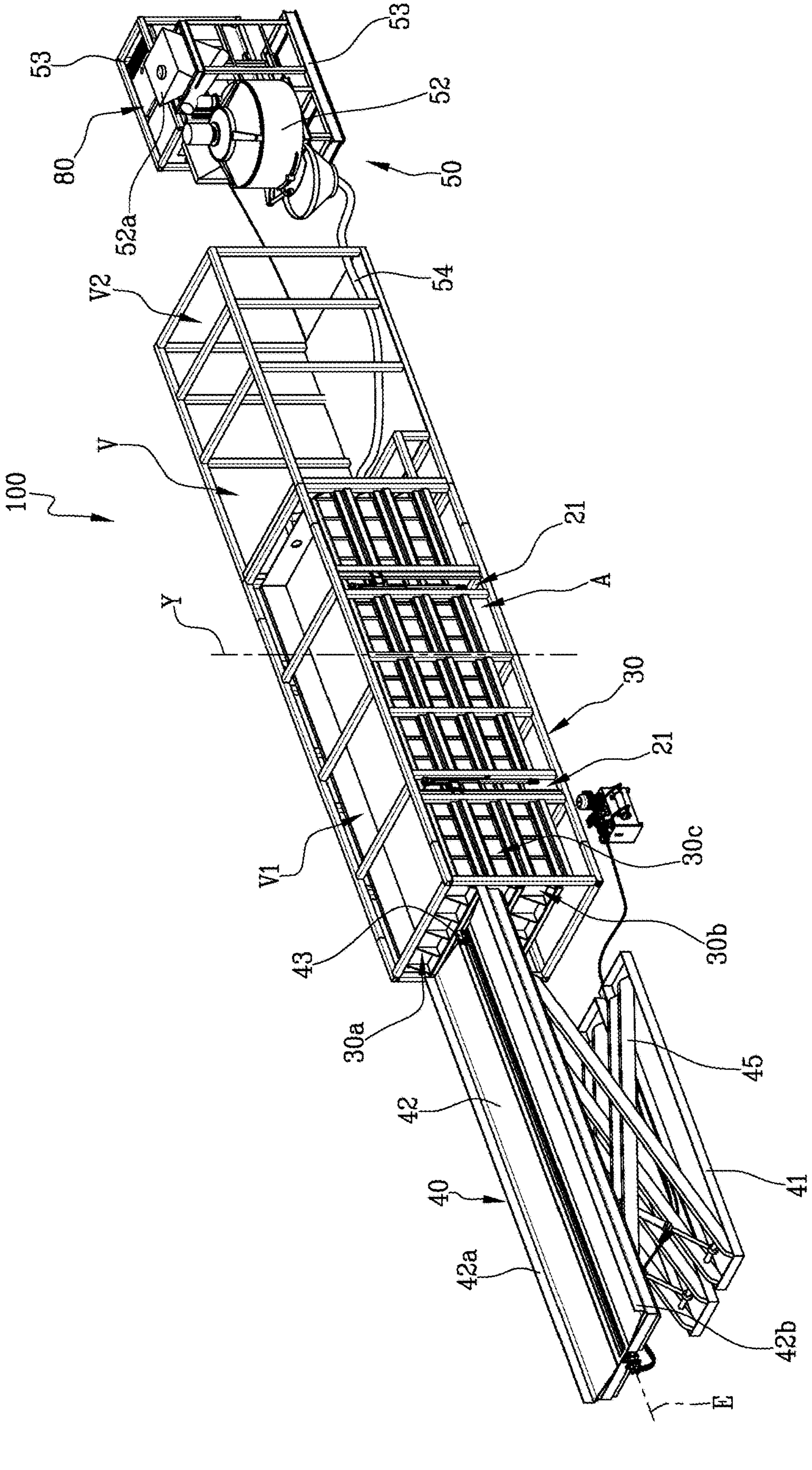
FIG. 1B shows the inside of the apparatus of figure.

As shown in FIGS. 1A and 1B, the feeding means 50 further comprises a mixer or cement mixer 52 arranged in the second subvolume "V2" and connected to the pump 51 by means of a connecting pipe 54, preferably of the flexible type.

In such a situation, the liquid concrete processed by the mixer 52 is brought, through the connecting pipe 54, to the pump 51 which selectively dispenses it, by means of the feeding pipe 51*a*, to the formwork 30*a*, 30*b* to perform the filling thereof.

In the preferred embodiment, the mixer 52 defines a mixing chamber in which a cement mixture is mixed to form liquid concrete.

Figure 6:
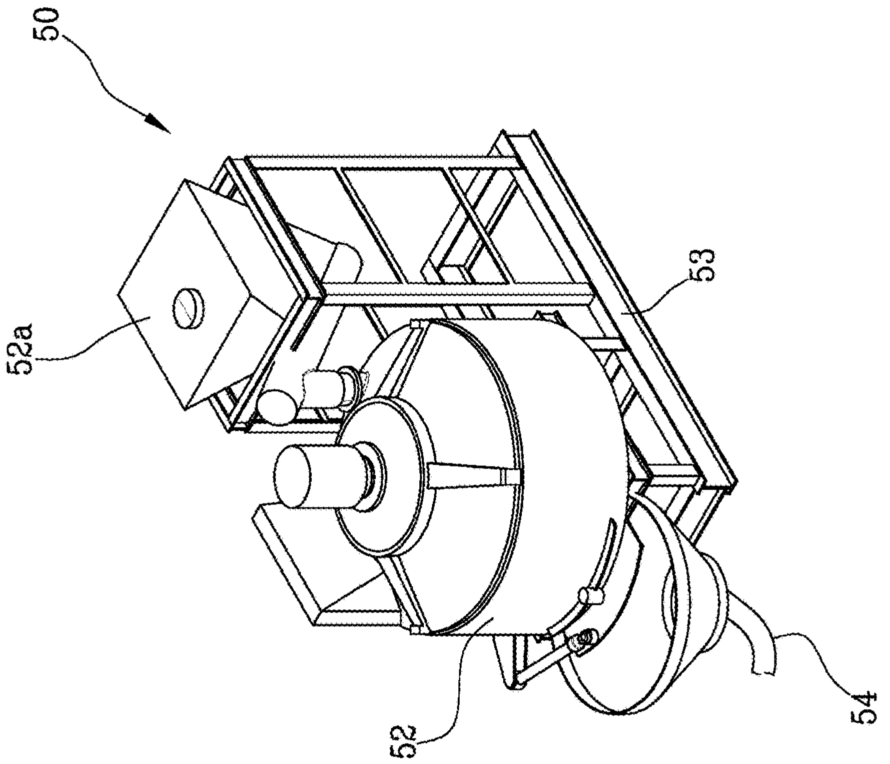
FIG. 6 shows a perspective view of a component of the apparatus of FIG. 1A.

In the preferred embodiment, shown in FIG. 6, the feeding means 50 further comprises a feeding hopper 52*a* arranged above the mixer 52 and configured to allow an insertion into the mixer 52 of the components of the cementitious mixture such as sand, gravel, water and the like.

In such a situation, the liquid concrete is dispensed into the connecting pipe 54 so that it reaches the pump 51 and is dispensed to each of the formworks 30*a*, 30*b*, 30*c*.

Figure 7A:
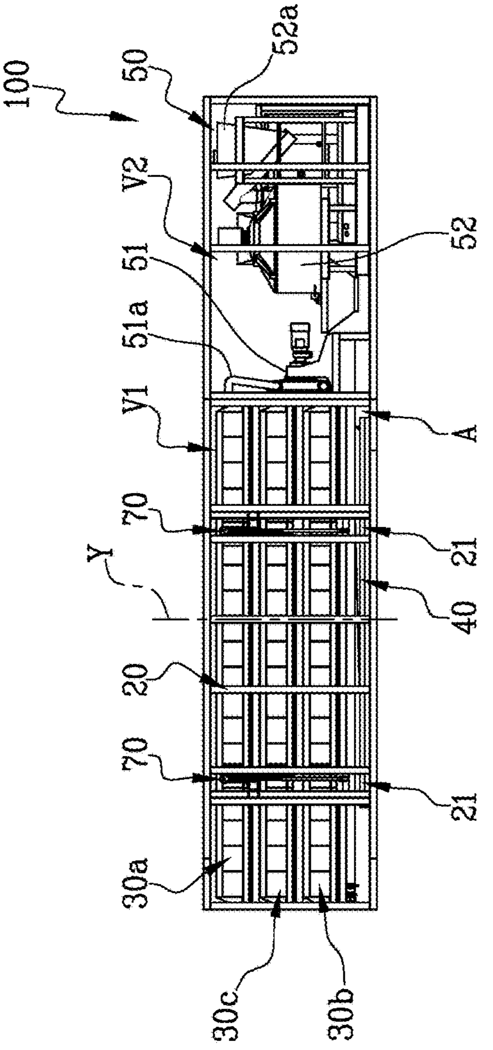
FIGS. 7A and 7B show a lateral view of an apparatus object of the present invention in two different configurations.
Figure 7B:
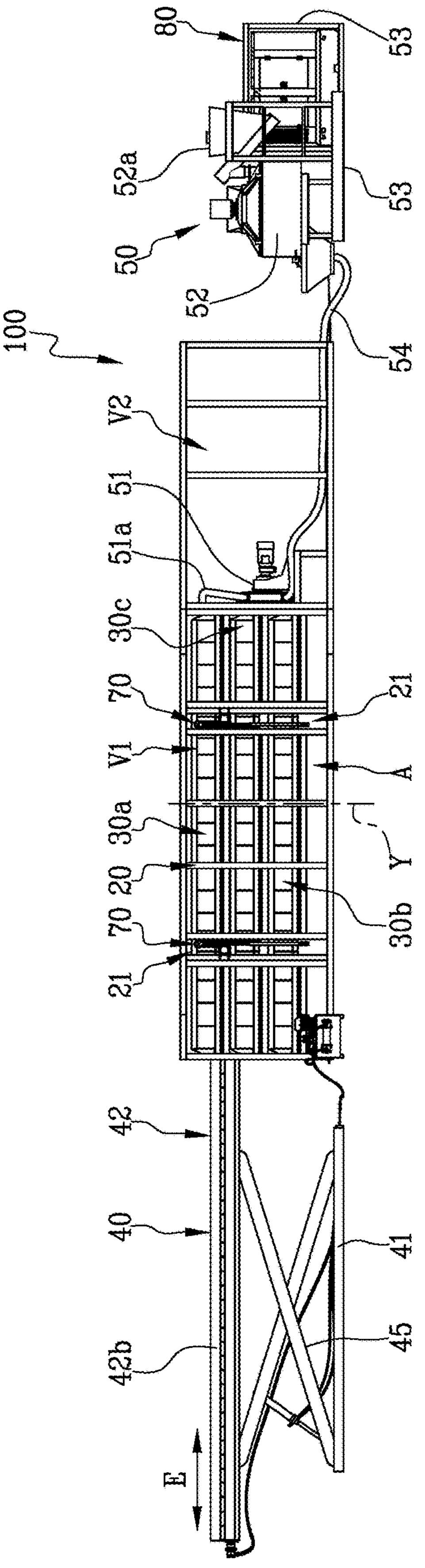

As shown in FIGS. 7A, 7B, the mixer or cement mixer 52 is operatively movable outside the containing structure 10.

The possibility of moving the mixer or cement mixer 52 inside or outside the containing structure 10, and in particular, from the second subvolume "V2", makes the apparatus 100 easily and conveniently transportable.

To further facilitate such movement, the mixer or cement mixer 52 is provided with a lattice and/or box-like frame 53.

Advantageously, the lattice and/or box-like frame 53 allows to engage, for example by means such as a forklift, crane or the like, the mixer or cement mixer 52 to easily extract or retract it within the second subvolume "V2" without however excessively weighing down the apparatus 100.

Alternatively, the apparatus 100 could provide, within the second subvolume "V2", a framing configured to support the mixer or cement mixer 52. Such a framing is movable, for example by means of hydraulic pistons, in an automated manner in extraction or retraction from the second subvolume "V2" to extract or retract the mixer or concrete mixer 52.

Advantageously, the movable framing allows the mixer or cement mixer 52 to be extracted or retracted without the aid of forklifts, cranes or the like.

Advantageously, the movable framing allows the mixer or cement mixer 52 to be extracted or retracted more safely, avoiding damage to the mixer or cement mixer 52 itself and to the operators.

In accordance with an aspect of the present description, the apparatus 100 further comprises a generator set 80 configured to electrically supply at least the pump 51.

Like the mixer 52, the generator set 80 is also configured to be arranged in the second subvolume "V2".

Preferably, the generator set 80 is operatively movable outside the containing structure 10.

Therefore like the mixer 52, the generator set 80 can also be extracted from the containing structure 10 when the apparatus 100 is in use or can be contained in the containing structure 10 when the apparatus 100 is transported.

Preferably, the mixer 52 and the generator set 80, when they are both placed within the second subvolume "V2", are mutually side by side.

As shown in the accompanying drawings, the generator set 80 is also provided with a lattice and/or box-like frame 53.

Advantageously, the lattice and/or box-like frame 53 allows to engage, for example by means such as a forklift or the like, the generator set 80 to extract or retract it comfortably within the second subvolume "V2" without however excessively weighing down the apparatus 100.

Advantageously, the lattice and/or box-like frame 53 also makes it possible to avoid that, when the apparatus 100 is transported and the generator set 80 and the mixer 52 are both housed within the second subvolume "V2", the latter collide damagingly.

Alternatively, if the apparatus 100 provides the movable framing within the second subvolume "V2", the generator set 80 could also be mounted therein so as to be moved in an automated manner in extraction or retraction from the second subvolume "V2".

In use, therefore, the apparatus 100 is transported to the place where it is intended to produce and assemble the concrete components.

During such transport, the formworks 30*a*, 30*b*, 30*c*, the generator set 80 and the mixer 52 are housed within the containing structure 10 respectively within the support frame 20 and within the second subvolume "V2".

Once the apparatus 100 is positioned, the generator set 80 and the mixer 52 are extracted from the second subvolume "V2". In such a situation, gravel, sand and the like for making the concrete are introduced, by means of the feeding hopper 52*a*, into the mixing chamber where they are mixed to form liquid concrete.

Subsequently, such liquid concrete is sent to the pump 51 by means of the connecting pipe 54. In such a situation, the feeding pipe 51*a* is connected to the feeding opening 32*a* of a first formwork 30*a*, 30*b*, 30*c* so that the liquid concrete can be dispensed by the pump 51 to fill the formwork 30*a*, 30*b*, 30*c* itself.

At the end of the filling of the first formwork 30*a*, 30*b*, 30*c*, the feeding pipe 51*a* is disconnected, the cap 32*b* is brought to the closing position to occlude the feeding opening 32*a* and the pump 51 suspends the dispensing. Subsequently, the supply pipe 51*a* is connected to the feeding opening 32*a* of a second formwork 30*a*, 30*b*, 30*c* and the pump 51 is activated so as to feed the liquid concrete therein.

The aforesaid operations for connecting the feeding pipe 51*a* and for filling are repeated for each formwork 30*a*, 30*b*, 30*c* housed in the support frame 20.

To ensure that the concrete components formed within the formworks 30*a*, 30*b*, 30*c* are of good quality and are provided with the correct mechanical properties, the apparatus 100 comprises at least one vibrating support 60 selectively associated or associable with one of the formworks 30*a*, 30*b*, 30*c*, in particular the bottom wall 31 of the formwork 30*a*, 30*b*, 30*c*, to generate a vibration of the formwork 30*a*, 30*b*, 30*c* when the latter is housed in the respective support area.

In particular, the vibrating support 60 generates vibration on the formwork 30*a*, 30*b*, 30*c* when the latter has just been filled with liquid concrete so as to encourage the exit of air contained therein.

Figure 4:
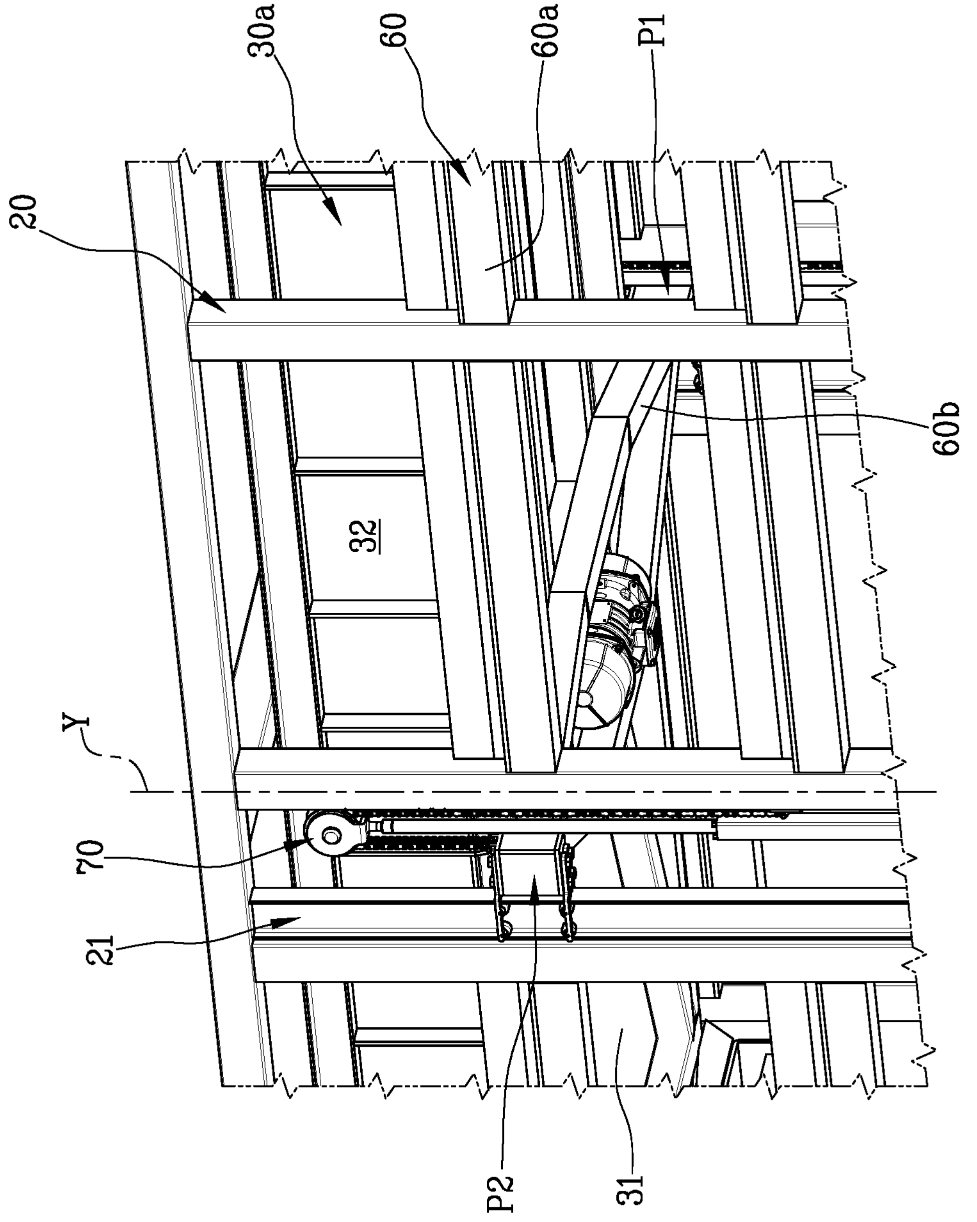
FIG. 4 shows a perspective view of an inner portion of the apparatus object of the present invention.

As shown in FIG. 4, the vibrating support 60 is mounted on the support frame 20.

More in detail, the vibrating support 60 has four vertices defining respective anchoring points "P1", "P2", "P3", "P4" of the vibrating support 60 to the support frame 20.

In a preferred embodiment, the vibrating support 60 has an extension, in plan, at least partially overlapping each formwork 30*a*, 30*b*, 30*c*.

Preferably, the vibrating support 60 has an extension, along the extraction direction "E" of the formworks 30*a*, 30*b*, 30*c*, comprised between 50% and 90% of the length of the formworks.

Even more preferably, as shown in FIG. 3, the vibrating support 60 comprises an elongated portion 60*a* of substantially rectangular shape and extending along the extraction direction "E" of the formworks 30*a*, 30*b*, 30*c*. The vibrating support 60 further comprises, near the ends of the elongated portion 60*a*, a first shaped portion 60*b* and a second shaped portion 60*c* extending transversely to the elongated portion 60*a* and projecting laterally therefrom to define the four anchoring points "P1", "P2", "P3", "P4" of the vibrating support 60.

As shown in FIG. 3, in a preferred embodiment, each formwork 30*a*, 30*b*, 30*c* comprises, on an outer surface of the bottom wall 31, an engagement structure 33 counter-shaped to the vibrating support 60 to reversibly constrain the formwork 30*a*, 30*b*, 30*c* to the vibrating support 30 so that they vibrate simultaneously.

That is, the outer surface of the bottom wall 31 of each formwork 30*a*, 30*b*, 30*c* and the vibrating structure 60 are engageable with each other by means of a shape connection so that the formwork 30*a*, 30*b*, 30*c* is made integral with the vibrating support 60 so as to vibrate together therewith.

Advantageously, the presence of the engagement structure 33 prevents that, during vibration, there is relative movement between the formwork 30*a*, 30*b*, 30*c* and the vibrating support 60 capable of causing a sliding of the formwork 30*a*, 30*b*, 30*c* on the vibrating support 60 itself.

In use, therefore, once a formwork 30*a*, 30*b*, 30*c* is filled with the liquid concrete, the vibrating support 60 is associated with the bottom wall 31 of the formwork 30*a*, 30*b*, 30*c* by means of the engagement structure 33 and is activated in vibration.

In accordance with an aspect of the present description, to abut against the bottom wall 31 of the formworks 30*a*, 30*b*, 30*c*, the vibrating support 60 is slidingly movable in the first subvolume "V1" along the stacking direction "Y".

In particular, the vibrating support 60 is configured to be arranged in a space left free from a formwork 30*a*, 30*b*, 30*c* extracted from the first subvolume "V1" and to abut below the formwork 30*a*, 30*b*, 30*c* so as to raise the latter and place it in vibration.

The vibrating support 60 is further configured to move vertically so as to actuate a temporary support of the formwork 30*a*, 30*b*, 30*c*, as will be described in detail below.

Preferably, the vibrating support 60 comprises lifting actuators 70, in particular cylinders or chains, configured to move the vibrating support 60 along the support frame 20 towards a formwork 30*a*, 30*b*, 30*c* to be vibrated or away therefrom at the end of the vibration generating operation.

In the embodiment shown in FIG. 4, the support frame 20 comprises vertical rails or guides 21 within which chains act to move the vibrating support 60 along the stacking direction "Y".

Preferably, the vertical rails or guides 21 are isolated relative to the vibratory movement of the vibrating support 60 so as to avoid damage to the support frame 20.

In the preferred embodiment, in order to perform a vibration of each formwork 30*a*, 30*b*, 30*c* containing liquid concrete, the support frame 20 is populated with formworks 30*a*, 30*b*, 30*c* starting from its top so that the vibrating support 60 can progressively be arranged below each formwork 30*a*, 30*b*, 30*c* as they are housed in the support frame 20.

That is, by way of non-limiting example, a first formwork 30*a*, 30*b*, 30*c* is housed within a respective support area near the top of the support frame 20 and the preset quantity of concrete is dispensed by the pump 51. At the end of the dispensing, the vibrating support 60 is slidingly moved vertically so as to abut against the bottom wall 31 of the first formwork 30*a*, 30*b*, 30*c*. In such a situation, the vibrating support 60 is located in a free space of the support frame 20, i.e., in a support area of a formwork 30*a*, 30*b*, 30*c* not occupied by any formworks 30*a*, 30*b*, 30*c*. In such a position, the vibrating support 60 engages the formwork 30*a*, 30*b*, 30*c* thereabove, temporarily supports it and causes a vibration thereof adapted to let the air exit from the concrete.

Subsequently, the vibrating support 60 rests the formwork 30*a*, 30*b*, 30*c* within the support frame 20 again and disengages the formwork 30*a*, 30*b*, 30*c* moving away therefrom along the stacking direction "Y".

Subsequently, a second formwork 30*a*, 30*b*, 30*c* is housed in the support frame 20 below the first formwork 30*a*, 30*b*, 30*c* and is filled with concrete.

In such a situation, the vibrating support 60 is again activated to abut against the bottom wall 31 of the second formwork 30*a*, 30*b*, 30*c* and cause the vibration thereof. The operations of inserting the formworks 30*a*, 30*b*, 30*c* into the support frame 20, the operations of filling the formworks 30*a*, 30*b*, 30*c* and the operation of moving the vibrating support 60 are repeated for each formwork 30*a*, 30*b*, 30*c* which is progressively inserted into the support frame 20 and filled with concrete.

At the end of filling the formworks 30*a*, 30*b*, 30*c* and the action of the vibrating support 60 on each one thereof, the concrete begins its drying within the formworks 30*a*, 30*b*, 30*c* housed in the support frame 20.

In order to extract the concrete components from each formwork 30*a*, 30*b*, 30*c* and/or in order to re-insert each empty formwork 30*a*, 30*b*, 30*c* within the support frame 20 to perform new concrete pourings, the apparatus 100 comprises an extractor device 40.

The extractor device 40 is configured to withdraw at least one formwork 30*a*, 30*b*, 30*c* from a respective support area by moving the formwork 30*a*, 30*b*, 30*c* at least along an extraction direction "E" between the storage and extraction configurations.

Figure 2:
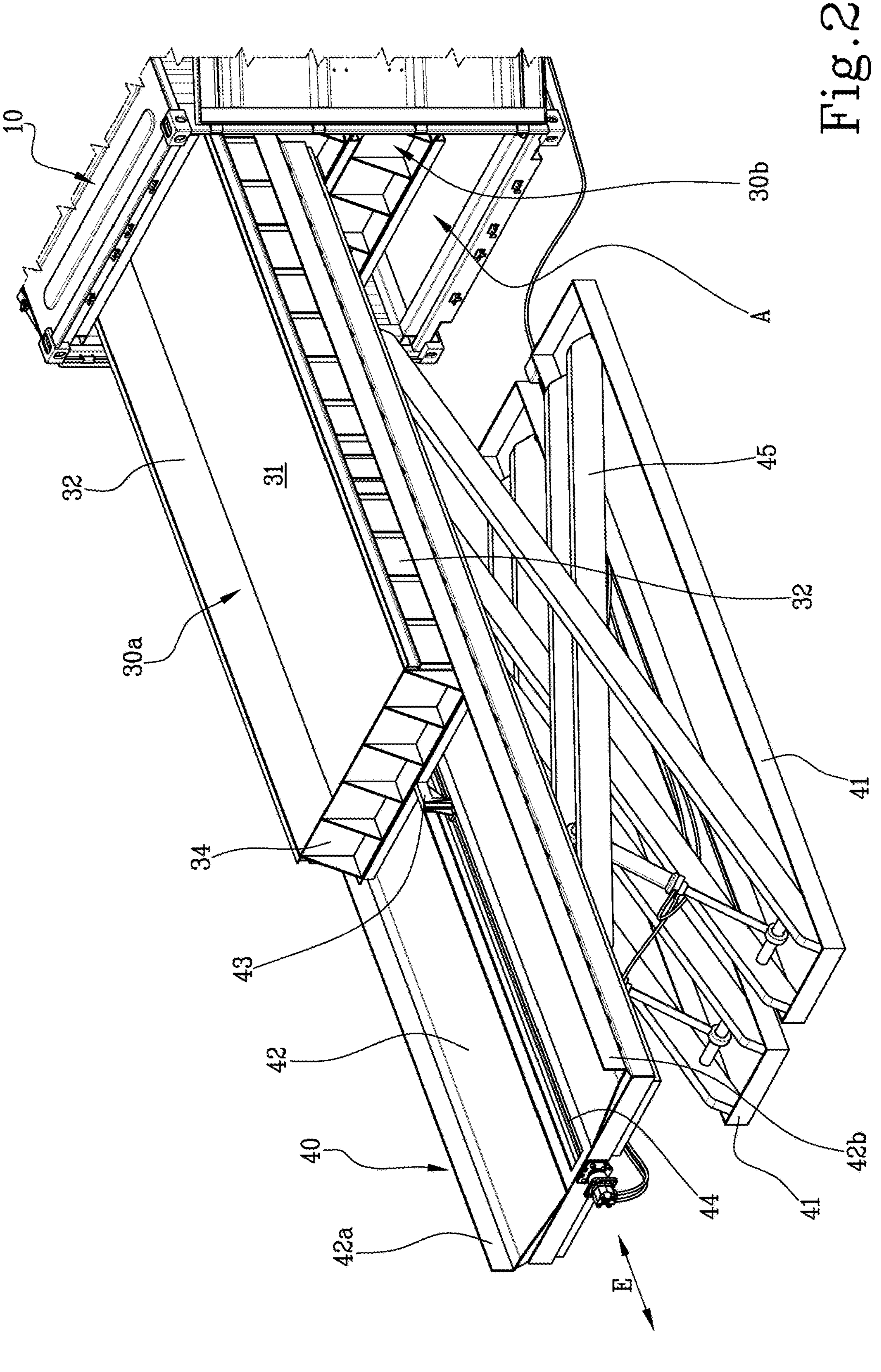
FIG. 2 shows an enlargement of a portion of apparatus of FIG. 1A.

In accordance with an aspect of the present description, as shown for example in FIGS. 1A-2, the extractor device 40 has a rest base 41, preferably made in the form of two mutually parallel skids.

The extractor device 40 also has a vertically movable support platform 42 to be brought to the level of a formwork 30*a*, 30*b*, 30*c* to be extracted (or possibly to the level of a support area in which it is intended to insert a formwork 30*a*, 30*b*, 30*c*).

In use, in fact, the support platform 42 is lowered or lifted parallel to the stacking direction "Y" so as to be arranged at a height equal to the height of the formwork 30*a*, 30*b*, 30*c* which is intended to be extracted (or inserted) from the support frame 20. In such a situation, during the extraction (or insertion), the formwork 30*a*, 30*b*, 30*c* is progressively slid onto the support platform 42, as will be described in detail below.

Preferably, the support platform 42 comprises a pair of sliding partitions 42*a*, 42*b* extending along opposite edges of the support platform 42 itself. The pair of sliding partitions 42*a*, 42*b* is configured to guide a formwork 30*a*, 30*b* so that the latter, passing from the storage configuration to that of extraction or vice versa, does not slide or deviate with respect to the extraction direction "E".

In accordance with an aspect of the present description, the extractor device 40 comprises, interposed between the support platform 42 and the rest base 41, a movement mechanism 45 configured to raise or lower the support platform 42 so as to place the latter at the level of the formwork 30*a*, 30*b*, 30*c* which is to be extracted (or possibly insert within the respective support area).

Preferably, the movement mechanism 45 is made in the form of a scissor lift provided with a plurality of actuators, for example hydraulic actuators, configured to allow a lifting or lowering of the support platform 42.

Preferably, the actuators for the movement of the movement mechanism 45 are powered by the generator set 80.

Alternatively, the actuators for the movement of the movement mechanism 45 are powered by a dedicated motor.

To perform the actual extraction, and therefore to bring the formwork 30*a*, 30*b*, 30*c* from the storage configuration to the extraction configuration, the extractor device 40 comprises a gripping hook 43 protruding from the support platform 42 and configured to engage an edge of the formwork 30*a*, 30*b*, 30*c*.

The gripping hook 43 is slidably movable parallel to the extraction direction "E" of the formworks 30*a*, 30*b*, 30*c* to extract a formwork 30*a*, 30*b*, 30*c* from the respective support area and to transfer the formwork 30*a*, 30*b*, 30*c* onto the support platform 42.

The gripping hook 43 is also slidably movable parallel to the extraction direction "E" of the formworks 30*a*, 30*b*, 30*c* to insert a formwork 30*a*, 30*b*, 30*c* within the respective support area, transferring it from the support platform 42 to the support area itself.

In the preferred embodiment, the gripping hook 43 is slidably movable within a longitudinal guide 44 obtained in a centre line of the support platform 42.

Preferably, the gripping hook 43 is slidably moved by means of a chain, a belt or a ball screw extending within the longitudinal guide 44 and activatable by means of a motor (for example by the same motor which starts the actuators of the movement means 45) or by the generator set 80.

In use, therefore, when there is a need to extract a formwork 30*a*, 30*b*, 30*c*, the movement means 45 is activated so as to bring the support platform 42 to the level of the formwork 30*a*, 30*b*, 30*c* to be extracted (FIG. 1A, 1B).

Preferably, the support platform 42 is moved vertically so as to lie at the same height as the bottom wall 31 of the formwork 30*a*, 30*b*, 30*c* to be extracted.

After the movement of the support platform 42, the gripping hook 43 is slid along the longitudinal guide 44 approaching the edge, preferably the lower edge, of the formwork 30*a*, 30*b*, 30*c* to be extracted and firmly engages the latter. In such a situation, the gripping hook 43 is again slid, in the opposite direction relative to the previous one, so as to drag the formwork 30*a*, 30*b*, 30*c* therewith, which is thus extracted from the respective support area passing to the extraction configuration (FIG. 2).

During the extraction of the formwork 30*a*, 30*b*, 30*c*, the latter, as shown in FIG. 2, is progressively made to rest on the support platform 42 until the gripping hook 43 ends its sliding motion and the entire lower wall of the formwork 30*a*, 30*b*, 30*c* is found resting on the support platform 42.

Following the positioning of the formwork 30*a*, 30*b*, 30*c* on the support platform 42, the extractor device 40 can be moved away from the containing structure 10 and, possibly, the support platform 42 can be lowered so as to be able to perform a removal of the concrete component from the formwork 30*a*, 30*b*, 30*c*.

In accordance with a further aspect of the present invention, as shown in FIG. 7A, the extractor device 40 is configured to assume a collapsed configuration defining a minimum encumbrance. In such a situation, the first subvolume "V1" has, in a lower portion thereof arranged below the support areas, a housing "A" intended for containing the extractor device 40 in the collapsed configuration.

That is, when there is no need to extract and/or move the formworks 30*a*, 30*b*, 30*c* from the support frame 20, the extractor device 40 is brought into a collapsed configuration and is inserted into the housing "A" below the support areas occupied by the formworks 30*a*, 30*b*, 30*c*.

Advantageously, the possibility of inserting the extractor device 40, when not in use, within the housing "A", allows to limit the dimensions of the apparatus 100, making it particularly manageable and easy to transport towards the place where concrete components must be produced.

In accordance with a possible embodiment shown in FIGS. 7A, 7B, the housing "A" extends, along the extraction direction "E", entirely below the support areas and at least partially below the second subvolume "V2".

Preferably, the housing "A" extends to below the pump 51 which is thus raised as aforesaid.

In use, therefore, during the transport of the apparatus 100, the extractor device 40 as well as the generator set 80 and the concrete feeding means 50 are contained within the containing volume "V" delimited by the support structure 10.

Following the positioning of the apparatus 100 in the place where it is intended to perform the production of the concrete components, the feeding means 50 and the generator set 80 are extracted from the second subvolume "V2" while the extractor device 40, which is in a collapsed configuration, is extracted from the housing "A".

Preferably, the extraction occurs by sliding the extractor device 40 parallel to the extraction direction "E".

Even more preferably, the rest base 41 of the extractor device 40 is slidable, in particular slidably fitted to the support frame 20, to move the extractor device 40 in extraction from the first subvolume "V1" to an operating position that is suitable for extracting the formworks 30*a*, 30*b*, 30*c* from the support areas.

In particular, in the operating position, the extractor device 40 is aligned with the containing structure 10 in the extraction direction "E" and facing the support frame 20 where the formworks 30*a*, 30*b* are housed.

In such a situation, the movement means 45 can be activated so as to move the support platform 42 vertically to bring it to the level of a formwork 30*a*, 30*b*, 30*c* to be extracted (FIG. 1A, 1B, 7B), for example to the level of a formwork 30*a*, 30*b*, 30*c* in which the liquid concrete has already been dispensed by the pump 51.

Following the positioning of the support platform 42, the gripping hook 43 is moved to approach the edge of the formwork 30*a*, 30*b*, 30*c* and firmly engage such an edge (FIG. 2).

Subsequently, the gripping hook 43 is moved in the opposite direction to the previous one so as to drag the formwork 30*a*, 30*b*, 30*c* therewith, which is extracted from the respective support area and is progressively arranged on the support platform 42. During the extraction, the pair of sliding partitions 42*a*, 42*b* guides the formwork 30*a*, 30*b*, avoiding its slippage with respect to the extraction direction "E".

At the end of the extraction of the formwork 30*a*, 30*b*, 30*c*, the extractor device 40 is moved, by means of the rest base 41, away from the containing structure 10 and, possibly, the supporting platform 42 is lowered vertically so as to allow an extraction of the concrete component from the formwork 30*a*, 30*b*, 30*c*.

In accordance with an aspect of the present invention, the apparatus 100 could comprise a plurality of containing structures 10 each suitable for housing machinery and/or equipment suitable for the creation of concrete components.

In particular, the apparatus 100 could comprise a containing structure 10 for a washing and sieving plant. The apparatus could further comprise a containing structure 10 for a crushing and sorting plant.

The present invention achieves the proposed objects, eliminating the drawbacks that have emerged from the known art.

In particular, the apparatus 100 is compact and easily manageable and therefore particularly suitable to be transported for the production of concrete components where necessary.

The apparatus 100 is complete in that it allows to create the concrete, to pour the concrete in the formworks 30*a*, 30*b*, 30*c*, to store the formworks 30*a*, 30*b*, 30*c* for drying the concrete and to move such formworks 30*a*, 30*b*, 30*c* so as to extract the components obtained without the need for external interventions and/or the aid of further devices/structures outside the apparatus 100.

The apparatus 100 is highly easy to use, reducing human error during the creation of the cement components. Therefore, such an apparatus 100 is particularly suitable for use in less industrialised places where the workforce is scarcely specialised.

That is, the apparatus 100, while comprising in itself all the functions of a factory for cementitious artefacts, is simple and convenient to transport where there is a need. Furthermore, it is easy to use.

The possibility of filling the formworks 30*a*, 30*b*, 30*c* within the apparatus 100 and the possibility of storing the formworks 30*a*, 30*b*, 30*c* within the apparatus 100 itself allows to protect the concrete components from the external environment while preserving the mechanical qualities thereof.

The invention claimed is:

1. An apparatus (100) for on-site production of components for concrete building, comprising:

- a containing structure (10) suitable for conveying and defining a containing volume (V) which extends horizontally, said containing volume (V) comprising a first subvolume (V1) and a second subvolume (V2), placed alongside one another;
- a support frame (20) housed in the first subvolume (V1) and defining a plurality of support areas juxtaposed on one another along a vertical stacking direction (Y);
- at least two formworks (30*a*, 30*b*, 30*c*) each configured to contain a preset quantity of concrete to form at least one respective component, each formwork (30*a*, 30*b*, 30*c*) being slidably housable in a respective support area of the support frame (20) to assume a storage configuration, in which the formwork (30*a*, 30*b*, 30*c*) is inserted into the support frame (20), and an extraction configuration in which the formwork (30*a*, 30*b*, 30*c*) is at least partially extracted from the support frame (20);

an extractor device (40) configured to withdraw at least one formwork (30*a*, 30*b*, 30*c*) from a respective support area by moving the formwork (30*a*, 30*b*, 30*c*) at least along an extraction direction (E), which is horizontal, between said storage and extraction configurations;

liquid concrete feeding means (50) arranged at least partially in the second subvolume (V2) and configured to dispense said preset quantity of concrete to each formwork (30*a*, 30*b*, 30*c*) while said formwork (30*a*, 30*b*, 30*c*) is housed in the respective support area, said feeding means (50) comprising at least one pump (51) arranged in a fixed position; and at least one vibrating support (60) selectively associated or associable with one of said formworks (30*a*, 30*b*, 30*c*), in particular with a bottom wall (31) of the formwork (30*a*, 30*b*, 30*c*), to generate a vibration of said formwork (30*a*, 30*b*, 30*c*) when the formwork (30*a*, 30*b*, 30*c*) is housed in the respective support area, wherein said vibrating support (60) is fitted to the support frame (20) and vertically movable to implement a temporary support of the formwork (30*a*, 30*b*, 30*c*), and wherein said vibrating support (60) has a plan extension that is at least partially superimposed on each formwork (30*a*, 30*b*, 30*c*) and is slidably moveable in the first subvolume (V1) along the stacking direction (Y) to be arranged in a space left free by a formwork (30*a*, 30*b*, 30*c*) being extracted from said first subvolume (V1) and to abut below the formwork (30*a*, 30*b*, 30*c*) above so as to lift said formwork (30*a*, 30*b*, 30*c*) and make said formwork (30*a*, 30*b*, 30*c*) vibrate.

2. The apparatus according to claim 1, wherein said extractor device (40) has a rest base (41) and a support platform (42) that is vertically movable to go to a level of a formwork (30*a*, 30*b*, 30*c*) to be extracted and is configured to assume a collapsed configuration defining minimum overall dimensions, and in which said first subvolume (V1) has, in a lower portion thereof arranged below the support areas, a housing (A) intended to contain the extractor device (40) in said collapsed configuration.

3. The apparatus according to claim 2, wherein said rest base (41) is slidably fitted to the support frame (20) to move the extractor device (40) extractingly from the first subvolume (V1) to an operating position that is suitable for extracting the formworks (30*a*, 30*b*, 30*c*) from the support areas.

4. The apparatus according to claim 2, wherein said extractor device (40) comprises a gripping hook (43) protruding from said support platform (42) and configured to engage an edge of a formwork (30*a*, 30*b*, 30*c*), said gripping hook (43) being slidably movable parallel to the extraction direction (E) of the formworks (30*a*, 30*b*, 30*c*) to extract a formwork (30*a*, 30*b*, 30*c*) from the first subvolume (V1) and to transfer the formwork (30*a*, 30*b*, 30*c*) onto the support platform (42).

5. The apparatus according to claim 1, wherein said at least one vibrating support (60) has four vertices defining respective anchoring points (P1, P2, P3, P4) with lifting actuators (70), in particular cylinders or chains, and has an extension, along the extraction direction (E) of the formworks (30*a*, 30*b*, 30*c*), comprised between 50% and 90% of the length of the formworks (30*a*, 30*b*, 30*c*).

6. The apparatus according to claim 1, wherein said liquid concrete feeding means (50) comprises a mixer or cement mixer (52), arranged in the second subvolume (V2) and connected to said pump (51) by a connecting pipe (54) of flexible type, said mixer or cement mixer (52) being operationally movable outside the containing structure (10) and being provided with a lattice and/or frame (53).

7. The apparatus according to claim 1, further comprising a generator set (80) configured to supply electrically at least said pump (51), wherein the generator set (80) is configured to be arranged 15 in said second subvolume (V2), and wherein the generator set (80) is operationally movable outside the containing structure (10) and is provided with a lattice and/or frame (53).

8. The apparatus according to claim 1, wherein the pump (51) is connectable selectively, by a flexible feeding pipe (51 *a*), to each formwork (30*a*, 30*b*, 30*c*) housed in a respective support area to dispense, into said formwork (30*a*, 30*b*, 30*c*), said preset quantity of concrete, each formwork (30*a*, 30*b*, 30*c*) being provided, on a partition (34), with a feeding opening (32*a*) that is connectable in a reversible manner to said feeding pipe (51 *a*).

9. The apparatus according to claim 1, wherein said support frame (20) is a frame of lattice type and is sized to be inserted to measure into the containing structure (10).

10. The apparatus according to claim 1, wherein each formwork (30*a*, 30*b*, 30*c*) has a tank shape with a bottom wall (31), a pair of side walls (32), a pair of partitions (34) and is made of metal.

11. The apparatus according to claim 1, wherein said containing structure (10) comprises a 20', 40', or 45' container.

* * * * *